(12) United States Patent
Zarins

(10) Patent No.: US 12,078,277 B2
(45) Date of Patent: Sep. 3, 2024

(54) COUPLING FOR CONNECTING TWO SECTIONS OF PIPING

(71) Applicant: Applied System Technologies, Inc., Charlotte, NC (US)

(72) Inventor: Roman Todd Zarins, Denver, NC (US)

(73) Assignee: Applied System Technologies, Inc., Charlotte, NC (US)

( * ) Notice: Subject to any disclaimer, the term of this patent is extended or adjusted under 35 U.S.C. 154(b) by 11 days.

(21) Appl. No.: 17/870,747

(22) Filed: Jul. 21, 2022

(65) Prior Publication Data

US 2024/0027010 A1 Jan. 25, 2024

(51) Int. Cl.
*F16L 41/03* (2006.01)
(52) U.S. Cl.
CPC .................................. *F16L 41/03* (2013.01)
(58) Field of Classification Search
CPC ......... F16L 41/03; F16L 55/11; F16L 37/2445
See application file for complete search history.

(56) References Cited

U.S. PATENT DOCUMENTS

| 112,958 | A | * | 3/1871 | Ramp | F16L 37/105 |
| | | | | | 285/391 |
| 222,713 | A | * | 12/1879 | Lawson | F16L 9/08 |
| | | | | | 285/391 |
| 233,183 | A | * | 10/1880 | Babcock | F16L 3/00 |
| | | | | | 285/125.1 |
| 339,368 | A | * | 4/1886 | Black et al. | F16L 41/021 |
| | | | | | 285/130.1 |
| 494,671 | A | * | 4/1893 | Dudley-Cooper | F16L 58/182 |
| | | | | | 138/140 |
| 947,185 | A | * | 1/1910 | Mobean | H02G 3/083 |
| | | | | | 285/391 |
| 1,179,441 | A | * | 4/1916 | Lewis | G01P 13/008 |
| | | | | | 169/17 |
| 1,365,025 | A | * | 1/1921 | Elder | F16L 15/08 |
| | | | | | 285/31 |
| 1,444,727 | A | | 2/1923 | Burdin | |

(Continued)

FOREIGN PATENT DOCUMENTS

| WO | 2005024283 A1 | 3/2005 |
| WO | 2005052425 A2 | 6/2005 |

(Continued)

*Primary Examiner* — Zachary T Dragicevich
*Assistant Examiner* — James A Linford
(74) *Attorney, Agent, or Firm* — Seth L. Hudson; Maynard Nexsen PC

(57) ABSTRACT

A coupling with a main portion extending from a first end to a second end with an intermediate portion disposed between the first end and the second end. A main passageway extending from the first end to the second end. A first branch extending outwards from the intermediate portion containing a first branch passageway in fluid communication with the main passageway, and a second branch extending outwards from the intermediate portion and opposite the first branch containing a second branch passageway in fluid communication with the main passageway. External threads are disposed on an exterior surface of the first end containing an upper partition line and a lower partition line defined as the exterior surface of the first end, containing no external threads, and extending from the first end to the intermediate portion.

7 Claims, 7 Drawing Sheets

(56) References Cited

U.S. PATENT DOCUMENTS

| | | | |
|---|---|---|---|
| 1,539,287 A * | 5/1925 | Wilson | E21B 17/042 285/391 |
| 1,629,058 A * | 5/1927 | Wilson | E21B 17/0426 285/391 |
| 2,146,336 A | 2/1939 | Frey | |
| 2,460,622 A * | 2/1949 | Crawley | F16L 41/021 285/125.1 |
| 2,562,967 A * | 8/1951 | Teglung | F16L 41/021 285/130.1 |
| 2,695,797 A * | 11/1954 | McCarthy | F16L 37/2445 285/391 |
| 3,284,109 A | 11/1966 | Parker | |
| 3,355,193 A | 11/1967 | Craig | |
| 3,362,730 A | 1/1968 | St Clair | |
| 3,471,176 A | 10/1969 | Gilchrist | |
| 3,489,441 A | 1/1970 | William | |
| 3,524,466 A | 8/1970 | Van Scoy | |
| 3,622,184 A | 11/1971 | Deasy et al. | |
| 3,694,009 A | 9/1972 | Phillips | |
| 3,986,240 A | 10/1976 | Skinner | |
| 3,999,785 A | 12/1976 | Blakeley | |
| 4,073,513 A | 2/1978 | Blakeley | |
| 4,158,461 A | 6/1979 | Francis | |
| 4,258,941 A | 3/1981 | Sands | |
| 4,372,586 A | 2/1983 | Rosenberg | |
| 4,613,171 A | 9/1986 | Corcoran | |
| 4,790,058 A | 12/1988 | Miller | |
| 5,000,489 A | 3/1991 | Burke | |
| D334,050 S | 3/1993 | Foxlee | |
| 5,577,776 A | 11/1996 | Welch | |
| 5,971,001 A | 10/1999 | Andersson | |
| 6,301,917 B1 | 10/2001 | Lacoste | |
| 6,412,824 B2 | 7/2002 | Kunsman | |
| 7,552,742 B2 | 6/2009 | Dole | |
| 7,644,955 B1 | 1/2010 | Komolrochanapom | |
| 7,731,240 B2 | 6/2010 | Barker | |
| 7,926,855 B2 | 4/2011 | Kitagawa | |
| 7,980,599 B2 | 7/2011 | Schindel | |
| 8,746,752 B2 | 6/2014 | Hayashi | |
| 8,789,853 B2 | 7/2014 | Gershkovich et al. | |
| 8,870,235 B2 | 10/2014 | Turk | |
| 9,228,681 B2 | 1/2016 | Kluss | |
| 9,334,995 B2 | 5/2016 | Kremer et al. | |
| 9,574,691 B1 | 2/2017 | Crompton et al. | |
| 9,810,359 B2 | 11/2017 | Spears et al. | |
| 9,920,866 B2 | 3/2018 | Crompton et al. | |
| 9,989,175 B2 | 6/2018 | McAllister et al. | |
| 10,047,884 B2 | 8/2018 | Taylor | |
| 10,309,568 B2 | 6/2019 | Borawski | |
| 10,794,785 B2 | 10/2020 | Hayes et al. | |
| 2004/0163970 A1 | 9/2004 | Chelchowski et al. | |
| 2005/0134038 A1 | 6/2005 | Walsh | |
| 2008/0011358 A1 | 1/2008 | Brandt et al. | |
| 2008/0106092 A1 | 5/2008 | Klein et al. | |
| 2008/0111376 A1 | 5/2008 | Ferrero | |
| 2008/0203723 A1 | 8/2008 | Cellemme | |
| 2008/0309067 A1 | 12/2008 | Fazakerly | |
| 2009/0208271 A1 | 8/2009 | Krohn | |
| 2009/0267345 A1 | 10/2009 | Choi | |
| 2010/0230957 A1 | 9/2010 | Tsuda | |
| 2010/0314863 A1 | 12/2010 | Ohara et al. | |
| 2012/0306118 A1 | 12/2012 | Hayashi et al. | |
| 2013/0181446 A1 | 7/2013 | Le Clinche | |
| 2014/0238506 A1 | 8/2014 | Adams et al. | |
| 2015/0300549 A1 | 10/2015 | Cheng-Sheng et al. | |
| 2015/0323112 A1 | 11/2015 | Wright | |
| 2016/0040816 A1 | 2/2016 | Cheng-Sheng et al. | |
| 2016/0348490 A1 | 12/2016 | Holm et al. | |
| 2016/0358517 A1 | 12/2016 | Pate et al. | |
| 2017/0205010 A1 | 7/2017 | Pai | |
| 2018/0283767 A1 | 10/2018 | Conley | |
| 2019/0032823 A1 | 1/2019 | McNamara et al. | |
| 2019/0390801 A1 | 12/2019 | Puckett et al. | |
| 2020/0263818 A1 | 8/2020 | Prince | |
| 2020/0273377 A1 | 8/2020 | Tanghetti | |
| 2020/0370687 A1 | 11/2020 | Taylor | |
| 2022/0088660 A1 | 3/2022 | Wang | |

FOREIGN PATENT DOCUMENTS

| | | | |
|---|---|---|---|
| WO | 2005078332 A1 | 8/2005 | |
| WO | 2006087749 A1 | 8/2006 | |
| WO | 2008097053 A1 | 8/2008 | |
| WO | 2010047573 A1 | 4/2010 | |
| WO | 2010080027 A1 | 7/2010 | |
| WO | 2013056273 A2 | 4/2013 | |
| WO | 2016016490 A1 | 2/2016 | |
| WO | 2016036841 A1 | 3/2016 | |
| WO | 2016064118 A1 | 4/2016 | |
| WO | 2016206812 A1 | 12/2016 | |
| WO | 2017003023 A1 | 1/2017 | |
| WO | 2017004671 A1 | 1/2017 | |
| WO | WO-2017122726 A1 * | 7/2017 | E03B 9/02 |
| WO | 2018225915 A1 | 12/2018 | |
| WO | 2019182192 A1 | 9/2019 | |
| WO | 2020036637 A1 | 2/2020 | |

* cited by examiner

COUPLING FOR CONNECTING TWO SECTIONS OF PIPING

FIELD OF THE INVENTION

The present invention relates generally to a coupling for connecting piping, and more generally relates to a coupling for engaging at least two sections of piping used to transport compressed air.

BACKGROUND OF THE INVENTION

A compressed air piping system very generally consists of a compressor and piping to carry the compressed air to its desired destination. The piping that carries the compressed air may be placed in a building, such as a plant, stadium, arena, manufacturing facility, hospital, or the like. The piping is not a single piece of pipe laid in a straight line. Instead, the piping is composed of various shapes and sizes of pipe for carrying the compressed air. Each pipe serves a particular function in carrying the compressed air. Segments of pipes need to be joined together or coupled.

In joining segments of pipe, the coupling couples an end of each pipe segment together without affecting the functionality of the piping. The coupling may assist in not only joining two segments of pipe together, but may also assist in changing the direction of the pipe, allowing the piping to bend along a hallway, corridor, or the like. The coupling may also contain an additional inlet or outlet for allowing a measuring instrument to be inserted into the compressed air flow for measuring a particular parameter of the flow, such as flow rate, pressure, temperature and the like. The additional outlet portion may allow the compressed air to be redirected. Likewise, the additional inlet portion may be utilized to introduce another stream of compressed air into the flow of the piping or to introduce an element or item into the stream of compressed air flowing through the piping, such as an additional gas or other component (ions, odor control, etc.).

There is a need for a coupling that can easily and readily receive a push-to-connect fitting for joining two pipe segments together in an effective and efficient manner. There is also a need to provide coupling with two inlets and/or outlets in fluid communication with the main passageway for serving the purpose of the user.

BRIEF SUMMARY OF THE INVENTION

According to an embodiment of the present invention, a coupling includes a main portion extending from a first end to a second end with an intermediate portion disposed between the first end and the second end. A main passageway extending from the first end to the second end. A first branch extending outwards from the intermediate portion containing a first branch passageway in fluid communication with the main passageway, and a second branch extending outwards from the intermediate portion and opposite the first branch containing a second branch passageway in fluid communication with the main passageway. External threads are disposed on an exterior surface of the first end containing an upper partition line and a lower partition line defined as the exterior surface of the first end, containing no external threads, and extending from the first end to the intermediate portion. External threads are disposed on an exterior surface of the second end containing an upper partition line and a lower partition line defined as the exterior surface of the first end, containing no external threads, and extending from the first end to the intermediate portion.

According to yet another embodiment of the present invention, the first branch of the coupling is internally threaded.

According to yet another embodiment of the present invention, the second brand of the coupling is internally threaded.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
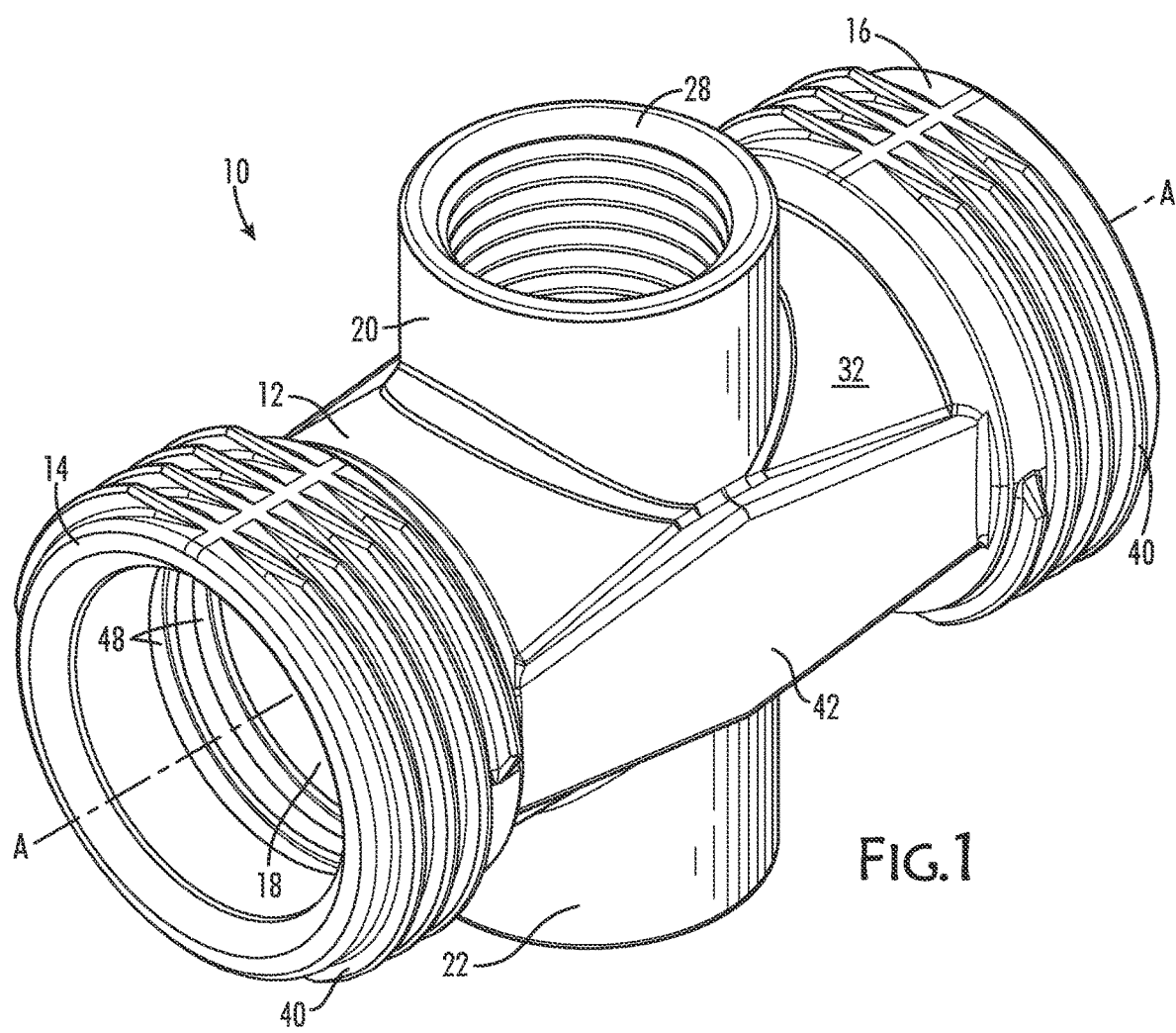
FIG. 1 is a perspective of an exemplary coupling.

Referring now specifically to the drawings, a coupling is illustrated in FIG. 1 and is shown generally at reference numeral 10. The coupling includes a main portion 12 that extends from a first end 14 to a second end 16 defining a main passageway 18 having an axis A-A. The main portion 12 contains an exterior surface and an internal surface, wherein the internal surface serves as the boundary of the main passageway 18.

Figure 2:
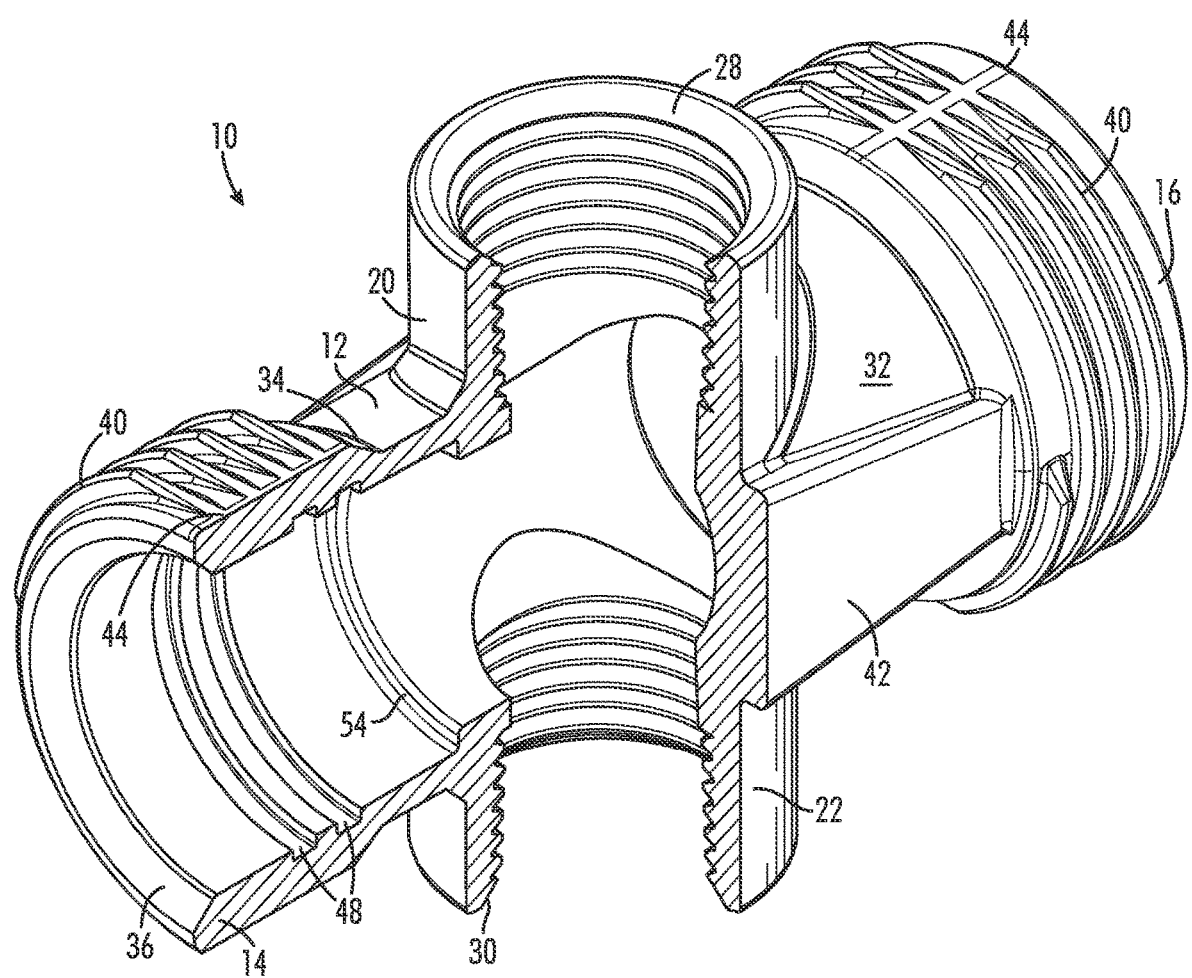
FIG. 2 is a partial cut-away view of an exemplary coupling.
Figure 3:
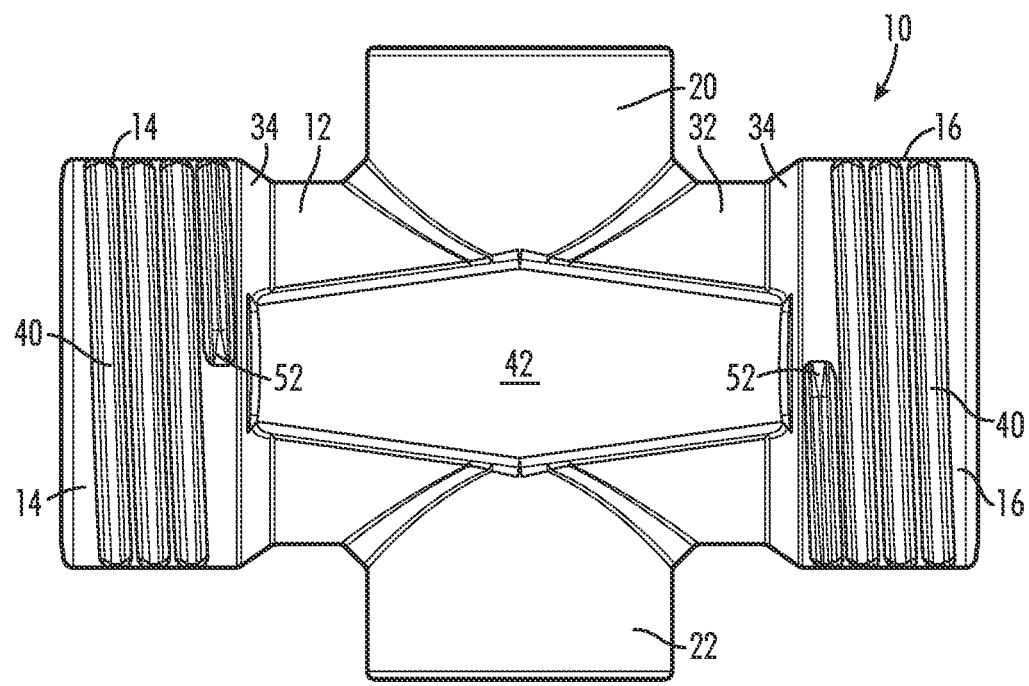
FIG. 3 is a side view of an exemplary coupling.
Figure 5:
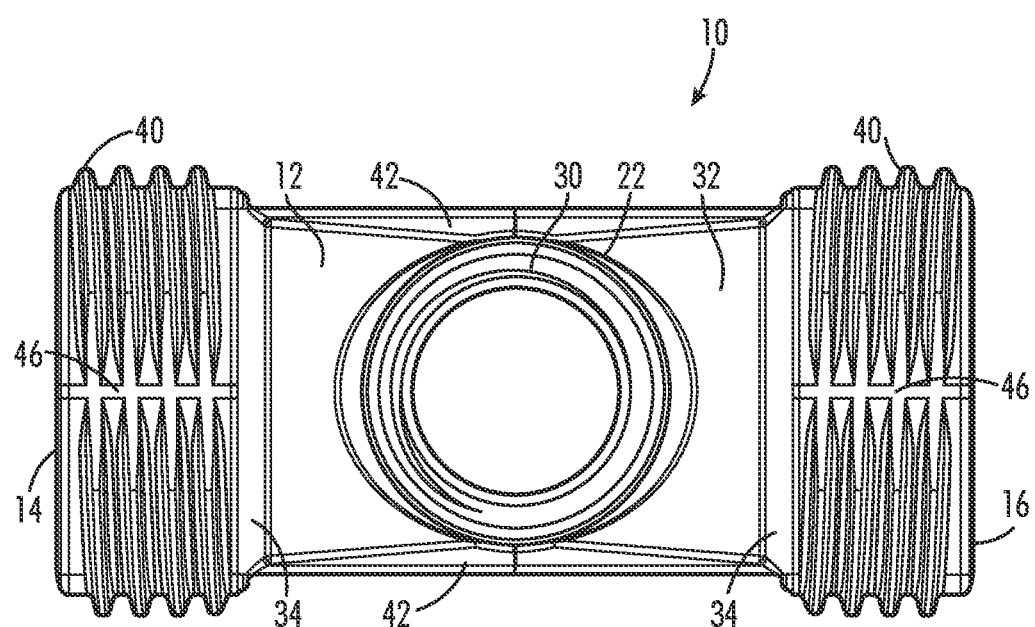
FIG. 5 is a bottom view of an exemplary coupling.
Figure 6:
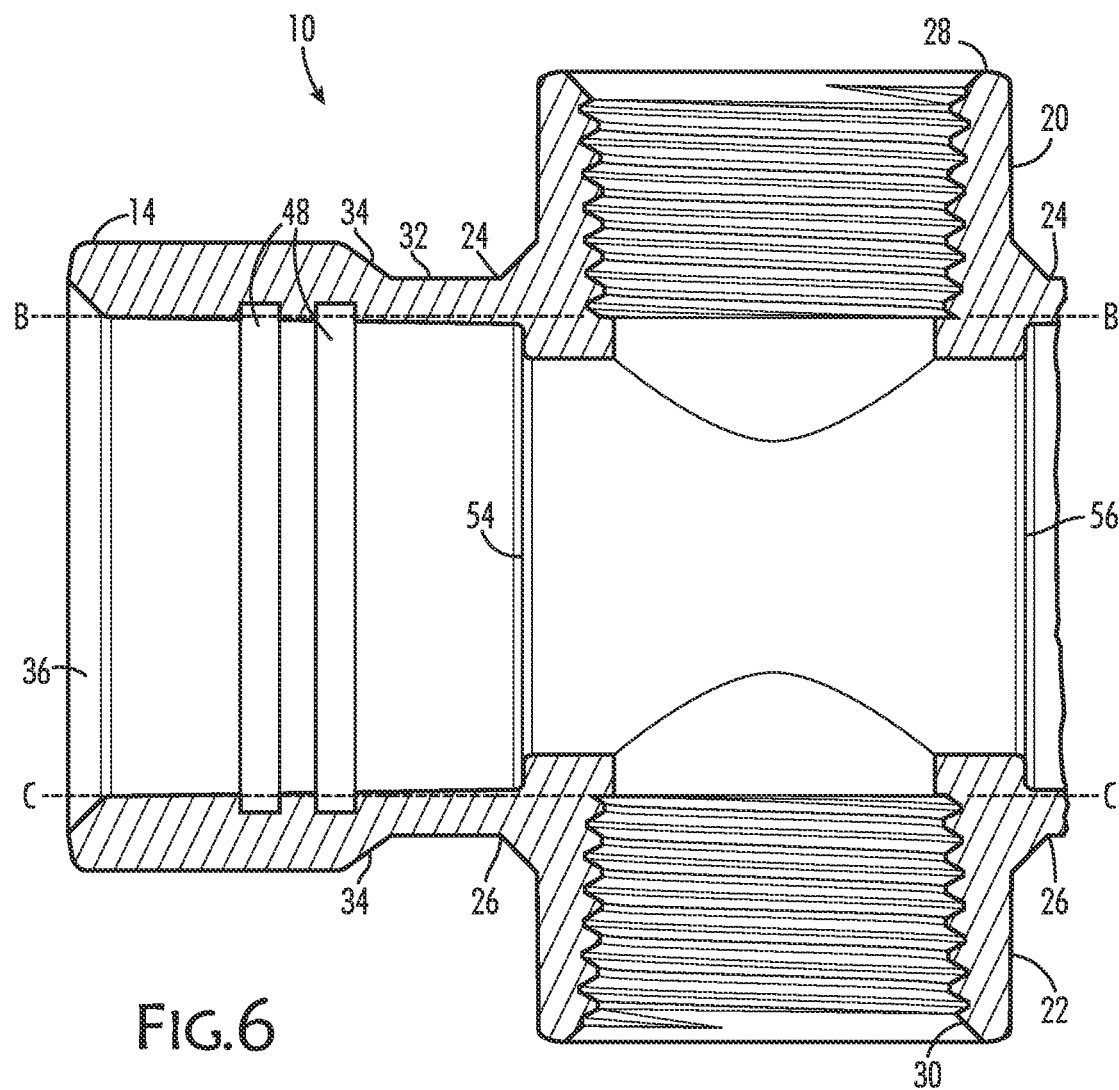
FIG. 6 is a partial cut-away view of an exemplary coupling.

A first branch 20 extends outwardly from the main portion 12. The first branch 20 extends outwardly from a first branch end 24 at the main portion 12 to an upper end. As illustrated, the first branch 20 extends outwardly perpendicularly from the main portion 12 at the first branch end 24. The first branch 20 is preferably cylindrical with an exterior surface and an interior surface that is internally threaded. The internal surface defines a first branch passageway. As illustrated in FIGS. 1, 2, and 5, the first branch 20 is more preferably internally threaded along a majority of the internal surface of the first branch 20. The threads preferably extend from the upper end to a location on the first branch 20 that is planar to the internal surface of the first end 14 and internal surface of the second end 16, as shown as B-B in FIG. 6. The upper end of the first branch 20 contains an inwardly tapered seat 28, extending internally from an outer edge of the upper end from the upper edge to the initial thread on the internal surface. The exterior surface of the first branch 20 is preferably smooth and does not contain any threads, ridges, channels, or the like. The first branch 20 is designed to receive an externally threaded device, such as a pipe, that corresponds with the internal threads of the first branch 20 for engaging the externally threaded device to the first branch 20.

A second branch 22 extends outwardly from the main portion 12. The second branch 22 extends outwardly from a second branch end 26 at the main portion 12 to an upper end. As illustrated, the second branch 22 extends outwardly perpendicularly from the main portion 12 at the second branch end 26. The second branch 22 is preferably cylindrical with an exterior surface and an interior surface that is internally threaded. The internal surface defines a second branch passageway. As illustrated in FIGS. 2 and 5, the second branch 22 is more preferably internally threaded along a majority of the internal surface of the second branch 22. The threads preferably extend from the upper end to a location on the second branch 22 that is planar to the internal surface of the first end 14 and internal surface of the second end 16, as shown as C-C in FIG. 6. The upper end of the second branch 22 contains an inwardly tapered seat 30, extending internally from an outer edge of the upper end from the upper edge to the initial thread on the internal surface. The exterior surface of the second branch 22 is preferably smooth and does not contain any threads, ridges, channels, or the like. The second branch 22 is designed to receive an externally threaded device, such as a pipe, that corresponds with the internal threads of the second branch 22 for engaging the externally threaded device to the second branch 22.

The first end 14 serves as a connection portion for a quick-to-connect fitting. The exterior surface of the first end 14 is externally threaded. The interior surface contains at least one, and as illustrated, a pair of annular, spaced-apart grooves 48 to accommodate seals or o-rings 64 therein. When a pipe segment is inserted, the o-rings 64 deform and engage the outer surface of the pipe segment, creating a fluid tight seal between the internal surface of the coupling 10 and the exterior surface of the pipe segment. The pipe segment carries a fluid, such as a gas or liquid. Preferably, the coupling 10 engages two pipe segments that carry air, such as compressed air, and compressed air flows through the main passageway 18, the first branch passageway, and the second branch passageway. The first end 14 and the second end 16 are disposed on either side of an intermediate portion 32 of the main portion 12. As shown in FIGS. 3-6, a transition portion 34 is disposed at the point where the first end 14 transitions to the intermediate portion 32. The transition portion 34 is preferably chamfered, creating a smooth transition that is a gradual reduction in the outside diameter between the first end 14 and the intermediate portion 32. The inside diameter of the first end 14 defining a portion of the main passageway 18 is not reduced as the first end 14 transitions to the intermediate portion 32 along the transition portion 34. Notwithstanding the grooves 48, the inside diameter of first end 14 is preferably constant. The first end 14 has an outside diameter greater than the outside diameter of the intermediate portion 32 between the transition portion 34 to the first branch end 24 and the second branch end 26. The outer end of the first end 14 contains an inwardly tapered seat 36, extending internally from an outer edge of the outer end and into the main passageway 18.

The second end 16 also serves as a connection portion for a quick-to-connect fitting. The exterior surface of the second end 16 is externally threaded. The interior surface contains at least one, and as illustrated, a pair of annular, spaced-apart grooves 48 to accommodate seals or o-rings 64. When a pipe segment is inserted, the o-rings 64 deform and engage the outer surface of the pipe segment, creating a fluid tight seal between the internal surface of the coupling 10 and the exterior surface of the pipe segment. As shown in FIGS. 3-6, a transition portion 34 is disposed at the point where the second end 16 transitions to the intermediate portion 32. The transition portion 34 is preferably chamfered, creating a smooth transition that is a gradual reduction in the outside diameter between the second end 16 and the intermediate portion 32. The second end 16 has an outside diameter greater than the outside diameter of the intermediate portion 32 between the transition portion 34 to the first branch end 24 and the second branch end 26. The inside diameter of the main passageway 18 is not reduced as the second end 16 transitions to the intermediate portion 32 along the transition portion 34. Notwithstanding the grooves 48, the inside diameter of first end 14 is preferably constant. The outer end of the second end 16 contains an inwardly tapered seat 38, extending internally from an outer edge of the outer end and into the main passageway 18.

Figure 4:
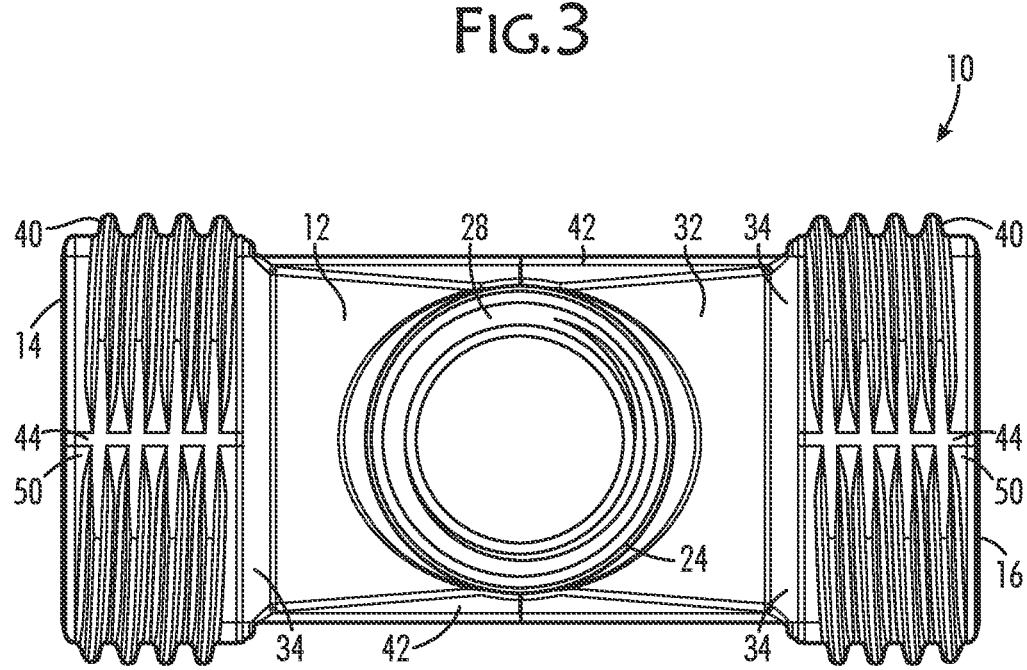
FIG. 4 is a top view of an exemplary coupling.

The first end 14 contains external threads 40. The external threads 40 are disposed on the exterior surface of the first end 14. The external threads 40 are angled in relation to the exterior surface of the first end 14 and preferably contains a thread height that corresponds to the pitch of the external threads 40. An upper partition line 44 and a lower partition line 46 are defined as the portion on the exterior surface of the first end 14 the majority of the external threads 40 begin and end. As shown in FIGS. 4 and 5, almost all the external threads 40 begin at the upper partition line 44 and extend along the exterior surface of the first end 14 to the lower partition line 44. The upper partition line 44 is disposed on the top side of the first end 14, and the lower partition line 46 is disposed on the bottom side of the first end 14. The external threads 40 begin on both sides of the upper partition line 44 and extend downwardly on both sides of the first end 14 to the lower partition line 46.

The second end 16 contains external threads 40. The external threads 40 are disposed on the exterior surface of the second end 16. The external threads 40 are angled in relation to the exterior surface of the second end 16 and preferably contains a thread height that corresponds to the pitch of the external threads 40. An upper partition line 44 and a lower partition line 46 are defined as the portion on the exterior surface of the second end 16 the majority of the external threads 40 begin and end. As shown in FIGS. 4 and 5, almost all the external threads 40 begin at the upper partition line 44 and extend along the exterior surface of the second end 16 to the lower partition line 44. The upper partition line 44 is disposed on the top side of the second end 16, and the lower partition line 46 is disposed on the bottom side of the second end 16. The external threads 40 begin on both sides of the upper partition line 44 and extend downwardly on both sides of the second end 16 to the lower partition line 46.

The width and/or height of each external thread 40 increases as the distance increases from the upper partition line 44, until a predetermined distance, at which the width and height of the external thread 40 remains constant, until the external thread 40 approaches the lower partition line 46, at which point, the width and/or height of the external thread 40 decrease as it approaches the lower partition line 46. The upper partition line 44 is defined as the exterior surface of the first end 14 between the beginning portions of each external thread 40 and extends between the outer edge of the first end 14 to the transition portion 34 between the first end 14 and the intermediate portion 32 on the top portion. The lower partition line 46 is defined as the exterior surface of the first end 14 between the ending portions of each external thread 40 and extends between the outer edge of the first end 14 to the transition portion 34 between the first end 14 and the intermediate portion 32 on the bottom portion. The start for the external threads 40 will generally not extend between the upper partition line 44 and the lower partition line 46. Likewise, the end of the external threads 40 will generally not extend between the upper partition line 44 and the lower partition line 46.

The start 50 is defined as the initial external thread 40 on the first end 14 and the second end 16 that is the closest to the outer end of the first end 14 and the second end 16. As illustrated, the start 50 does not extend from the upper partition line 44 to the lower partition line 46. The end 52 is defined as the final external thread 40 on the first end 14 and the second end 16 that is the closest to the transition portion 34 between the first end 14 and the second end 16 and the intermediate portion 32. As illustrated, the end 52 does not extend from the upper partition line 44 to the lower partition line 46.

The distance between adjacent external threads 40 of the coupling is referred to as the pitch. The pitch is measured parallel to the axis of the first end 14 and the second end 16 between corresponding points on adjacent surfaces in the same axial plane. The preferred pitch of the present inventions is between about 0.1 MM to about 6 MM, more preferably between about 1.5 MM to about 4 MM, and more preferably between about 2 MM to about 3 MM.

The crest of the external thread 40 is referred to as the top portion of each thread that is most prominent. The root is the bottom of the groove, which may be the exterior surface of the first end 14 and the second end 16 of the coupling 10 of the present invention, between two adjacent threads. The flank is the side of the external thread 40 from the root to the crest. The angle of the external threads 40 is the angle between flanks of adjacent external threads, measured in an axial plane section. The angle of the external threads 40 of the present invention is between about 10° to about 40°, and more preferably about 20° to about 35°, and most preferably 29°. The flank of the external threads 40 is between about 30 percent and about 70 percent of the pitch of the external threads 40, more preferably between about 40 to about 60 percent of the pitch of the external threads 40, and more preferably between about 50 percent to about 60 percent of the pitch of the external threads 40.

The first end 14 and the second end 16 are designed to receive a push-to-connect fitting. The external threads 40 are designed to correspond with internal threads within a push-to-connect fitting forming a selectively secured arrangement. A selectively secured arrangement is meant to define that the push-to-connect fitting may be engaged and disengaged from the coupling 10 in a relatively easy manner by the hand of a user without the need for tools and without damaging the push-to-connect fitting or the coupling 10 during engagement or disengagement.

The grooves 48 on the first end 14 and the second end 16 do not extend into the intermediate portion 32. The grooves 48 are positioned within the interior surface of the first end 14 and the second end 16. A least one groove 48 is positioned within the internal surface of the first end 14 below or underneath the external threads 40 on the exterior surface. An adjacent, spaced-apart groove 48 may be positioned within the internal surface of the first end 14 below or underneath the external threads 40, below or underneath the transition portion 34, or partially below or underneath the external threads 40 and partially underneath the transition portion 34. As illustrated, two grooves 48 are positioned within the interior surface of the first end 14, where one groove 48 is positioned below or underneath the external threads 40 and the adjacent groove 48 is partially positioned below or underneath the external threads 40 and partially positioned below or underneath the transition portion 34.

A least one groove 48 is positioned within the internal surface of the second end 16 below or underneath the external threads 40 on the exterior surface. An adjacent, spaced-apart groove 48 may be positioned within the internal surface of the second end 16 below or underneath the external threads 40, below or underneath the transition portion 34, or partially below or underneath the external threads 40 and partially underneath the transition portion 34. As illustrated, two grooves 48 are positioned within the interior surface of the second end 16, where one groove 48 is positioned below or underneath the external threads 40 and the adjacent groove 48 is partially positioned below or underneath the external threads 40 and partially positioned below or underneath the transition portion 34.

The outside diameter of the first branch 20 and the outside diameter of the second branch 22 are preferably identical. The structure of the first end 14 and the structure of the second end 16 are the same or mirror each other. Likewise, the inside diameter of the first branch 20 and the inside diameter of the second branch 22 are preferably identical. The diameter of the main passageway 18 is reduced within the intermediate portion 32 adjacent the first branch 20. A first lip 54 is disposed at the intersection of the interior surface of the first branch 20 and the interior surface of the intermediate portion 32. The first lip 54 is circular and serves as an end to the first branch passageway. The first lip 54 extends within the main passageway 18, thus reducing the diameter of the main passageway 18.

The diameter of the main passageway 18 is reduced within the intermediate portion 32 adjacent the second branch 22. A second lip 56 is disposed at the intersection of the interior surface of the second branch 22 and the interior surface of the intermediate portion 32. The second lip 56 is circular and serves as an end to the second branch passageway. The second lip 56 extends within the main passageway 18, thus reducing the diameter of the main passageway 18. The diameter of the first lip 54 and the diameter of the second lip 56 are preferably identical and serve as the inside diameter of the first branch 20 and the second branch 22.

The coupling 10 may contain an indicia marking portion 42 on the intermediate portion 32, which is a raised structure at a height above the outer surface of the intermediate portion 32. The indicia marking portion 42 is raised above the outer surface of the intermediate portion 32 and has a different elevation than the outer surface of the intermediate portion 32. The indicia marking portion 42 may be positioned on the front side and back side of the intermediate portion 32. Indicia is designed to be positioned on or within the indicia marking portion 42. The indicia may be in the form of text, symbols, and/or colors. The text, symbols, and/or colors may be molded, imprinted, and/or marked on the surface or within the indicia marking portion 42. The indicia may contain a company name, trademark, logo and the like.

As illustrated in FIGS. 1-5, the indicia marking portion 42 contains a first end and a second end. A top portion and a bottom portion extend between the first end and the second end in a spaced apart fashion, forming a central portion for the positioning or the inclusion of indicia. The first end and the second end of the indicia marking portion 42 has a width, the central portion of the indicia marking portion 42, between the top portion and the bottom portion has a width greater than the width of the first end and the second end of the indicia marking portion 42. The first end is preferably disposed on the transition portion 34 between the first end 14 and the intermediate portion 32, and the second end is preferably disposed on the transition portion 34 between the second end 16 and the intermediate portion 32 on the front side and/or back side of the coupling 10.

Figure 7:
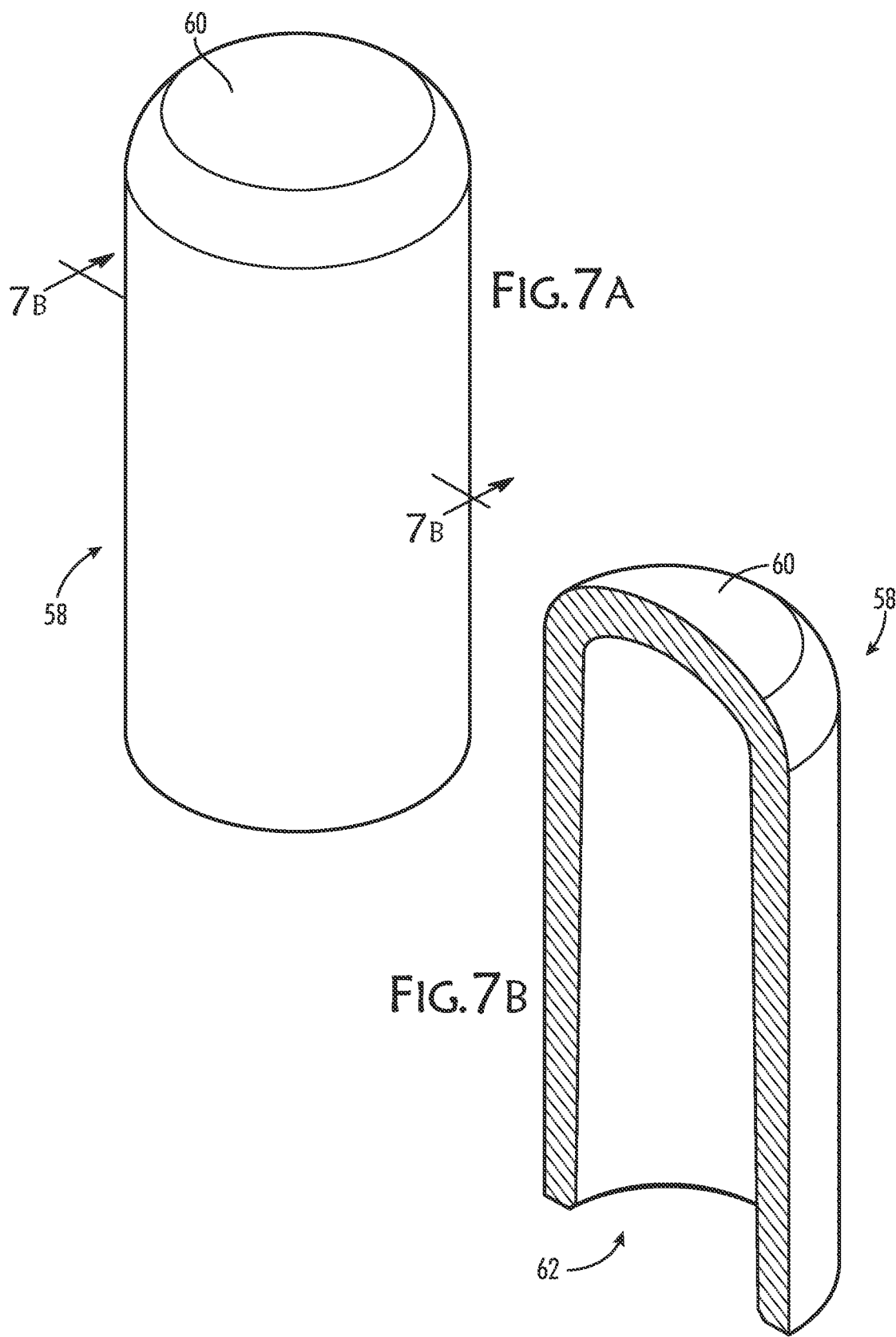
FIG. 7A is a perspective view of an exemplary plug cap.
FIG. 7B is a cut-away view of the exemplary plug cap in FIG. 7A along the line 6*b*.
Figure 8:
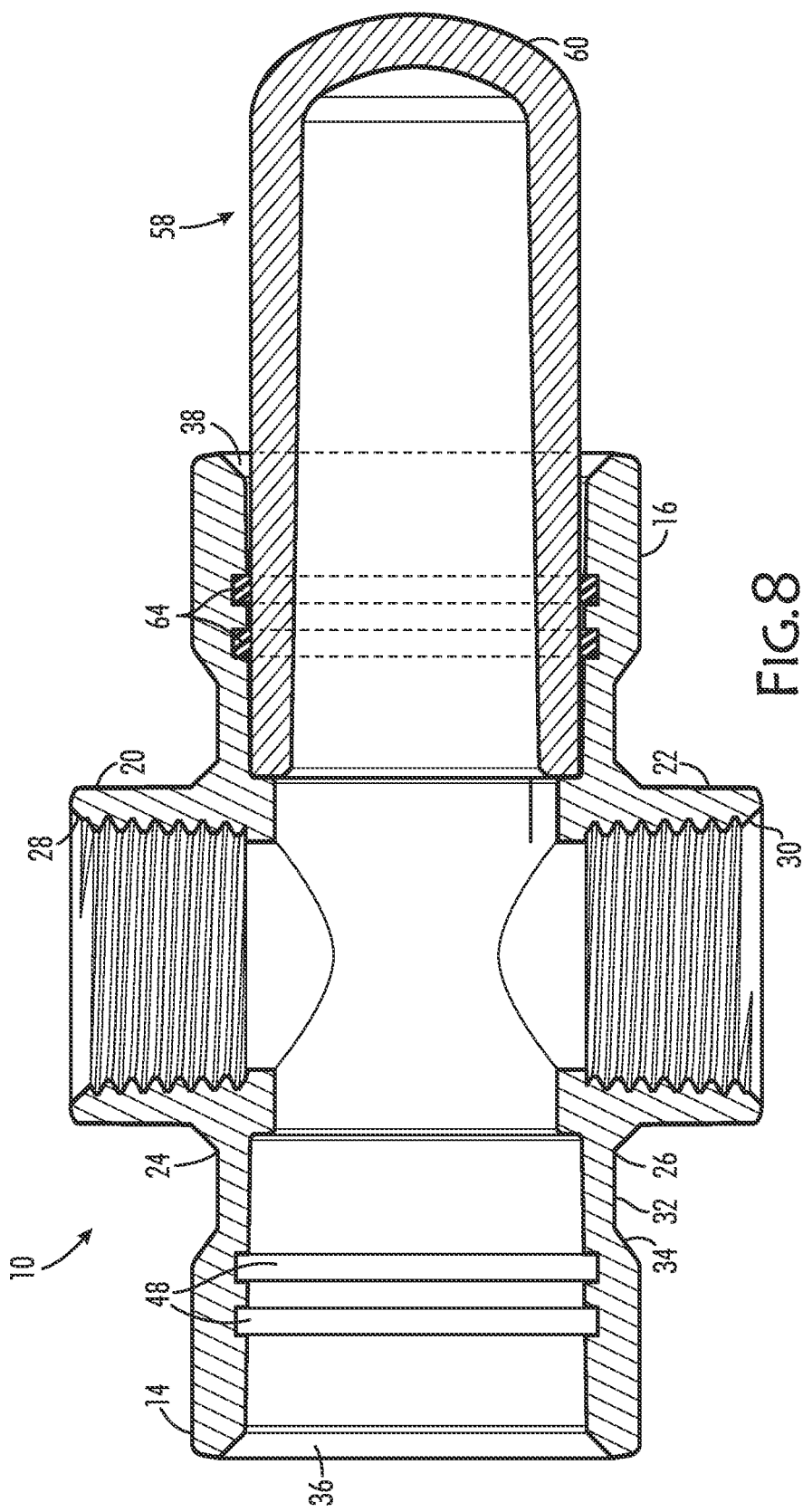
FIG. 8 is a cut-away view of the plug cap inserted into the first end of the exemplary coupling.

A plug cap 58, as illustrated in FIGS. 7A and 7B, may be inserted into an opening of the coupling 10, as shown in FIG. 8. The plug cap 58 is generally circular with a forward end and a rearward end. The forward end contains a domed cap 60, while the rearward end contains an opening to a cavity 62. The plug cap 58 is hollow and contains a cavity 62 defined by the inner surfaces of the plug cap 58. The forward end is "closed," while the rearward end is "open" and contains the opening and provides access to the central, hollow cavity 62 of the plug cap 58. The forward end may have a chamfered portion on the domed cap 60. The external surface of the plug cap 58 is smooth without any protrusions. Likewise, the internal surface of the plug cap 58 is smooth without any protrusions.

As illustrated in FIG. 8, the plug cap 58 is designed to be received within an opening of the coupling 10. The first end 14 and the second end 16 are designed to receive the plug cap 58 therein. The rearward end is inserted into the first end 14 and/or the second end of the coupling 10, extending into the main passageway 18. The outer end of the rearward end of the plug cap 58 is preferably positioned adjacent the first lip 54 when inserted into the first end 14 or the second lip 56 when inserted into the second end 16. The first lip 54 or second lip 56 prevent the plug cap 58 from proceeding further within the main passageway 18 and appropriately positions the plug cap 58 within the main passageway 18. The smooth exterior surface of the plug cap 58 allows the external surface to be positioned adjacent the smooth interior surface of the first end 14 and the second end 16. The forward end extends outwardly from the first end 14 and/or the second end 16 when inserted. The plug cap 58 is preferably composed of Aluminum and retained in place by friction fit. The o-rings 64 received within the grooves 48 of the first end 14 and the second end 16 may also retain the plug cap 58 within the first end 14 and the second end 16 and retained therein by friction fit. When the plug cap 58 is inserted, the o-rings 64 deform and engage the outer surface of the plug cap 58, creating a fluid tight seal between the internal surface of the coupling 10 and the plug cap 58. The plug cap 58 is not composed of copper and no adhesive, such as glue, is used to retain the plug cap 58 in place. Likewise, the plug cap 58 is not soldered in place.

The plug cap 58 is inserted into the opening within the first end 14 and/or the second end 16 of the coupling 10 when a fitting, such as a push-to-connect fitting is not engaged to the first end 14 and/or second end 16. During use, pressurized air flows through the coupling 10. If a fitting is not engaged to the first end 14 and/or second end 16, the pressurized air would flow out of the opening unobstructed. The plug cap 58 is designed to close the opening, preventing the flow of pressurized air through the first end 14 and/or second end 16 when a fitting is not engaged.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A coupling, comprising:
   a main portion that extends from a first end to a second end with an intermediate portion disposed between the first end and the second end,
   a main passageway extends from the first end to the second end;
   a first branch extending outwards from the intermediate portion containing a first branch passageway in fluid communication with the main passageway;
   a second branch extending outwards from the intermediate portion and opposite the first branch containing a second branch passageway in fluid communication with the main passageway;
   external threads disposed on an exterior surface of the first end containing an upper partition line and a lower partition line defined as the exterior surface of the first end, containing no external threads, and extending from the first end to the intermediate portion,
   wherein the internal surface of the first end comprises a first annular groove positioned below the external threads of the first end, and a second annular groove at least partially positioned below a transition portion of the main portion, wherein the transition portion is axially adjacent to the external threads of the first end, and wherein the coupling further comprises a plurality of o-rings, wherein a separate o-ring is positioned within each of the first annular groove and the second annular groove, wherein the o-rings are configured to engage with an exterior surface of a pipe inserted into the first end; and
   external threads disposed on an exterior surface of the second end containing an upper partition line and a lower partition line defined as the exterior surface of the second end, containing no external threads, and extending from the second end to the intermediate portion.

2. The coupling according to claim 1, wherein the first branch is internally threaded.

3. The coupling according to claim 1, wherein the second branch is internally threaded.

4. The coupling according to claim 1, wherein the first branch passageway and the second branch passageway are in axial alignment.

5. The coupling according to claim 1, wherein the internal surface of the second end contains at least one annular groove, and wherein the coupling further comprises at least one o-ring positioned within each of the at least one annular groove of the second end, wherein each of the at least one o-ring is configured to engage with an exterior surface of a pipe inserted into the second end.

6. The coupling according to claim 1, further comprising an indicia marking portion disposed on at least one side of the intermediate portion for displaying indicia.

7. The coupling according to claim 1, wherein an interior diameter of the first end and an interior diameter of the second end is greater than an interior diameter of the intermediate portion.

\* \* \* \* \*